(12) United States Patent
Kajuch

(10) Patent No.: US 7,509,971 B2
(45) Date of Patent: Mar. 31, 2009

(54) VALVE ASSEMBLY WITH COMPLIANT ESCUTCHEON

(75) Inventor: Pete Kajuch, Brookfield, WI (US)

(73) Assignee: Kohler Co., Kohler, WI (US)

( * ) Notice: Subject to any disclaimer, the term of this patent is extended or adjusted under 35 U.S.C. 154(b) by 464 days.

(21) Appl. No.: 11/052,964

(22) Filed: Feb. 8, 2005

(65) Prior Publication Data

US 2006/0174946 A1    Aug. 10, 2006

(51) Int. Cl.
*F16L 5/00*    (2006.01)
*F16K 31/524*    (2006.01)

(52) U.S. Cl. .......................... 137/359; 251/86; 251/293

(58) Field of Classification Search ............. 251/84–86, 251/293; 137/359–360
See application file for complete search history.

(56) References Cited

U.S. PATENT DOCUMENTS

| | | | |
|---|---|---|---|
| 572,911 A | 12/1896 | Schmidt | |
| 1,163,457 A | 12/1915 | Regar | |
| 1,322,979 A * | 11/1919 | Waite | 251/293 |
| 1,410,846 A * | 3/1922 | Stewart | 251/293 |
| 1,436,667 A | 11/1922 | Mueller | |
| 1,931,751 A * | 10/1933 | Brown et al. | 251/293 |
| 2,687,024 A * | 8/1954 | George | 464/112 |
| 2,896,222 A | 7/1959 | Freibott | |
| 3,067,436 A | 12/1962 | Freibott | |
| 3,190,306 A * | 6/1965 | Stat et al. | 137/359 |
| 3,291,927 A | 12/1966 | Riley, Jr., et al. | |
| 3,448,755 A | 6/1969 | Symmons | |
| 3,960,016 A | 6/1976 | Symmons | |
| 4,007,907 A * | 2/1977 | Branson et al. | 251/85 |
| 4,495,963 A * | 1/1985 | Hensley | 251/293 |
| 4,647,006 A * | 3/1987 | Glynn et al. | 251/86 |
| 5,257,771 A * | 11/1993 | Portis et al. | 251/293 |
| 5,467,799 A | 11/1995 | Buccicone et al. | |
| 5,531,243 A * | 7/1996 | Broussard | 251/292 |
| 5,732,602 A | 3/1998 | Schwartz | |
| 6,065,735 A * | 5/2000 | Clark | 251/293 |
| 6,419,276 B1 | 7/2002 | Gatter et al. | |
| 6,662,821 B2 * | 12/2003 | Jacobsen et al. | 251/292 |
| 6,666,227 B2 * | 12/2003 | Erickson | 137/359 |
| 6,807,983 B1 | 10/2004 | Erickson | |

FOREIGN PATENT DOCUMENTS

| | | |
|---|---|---|
| DE | 102 19 471 A1 | 11/2003 |
| GB | 794 265 A | 4/1958 |
| GB | 946 937 A | 1/1964 |

* cited by examiner

*Primary Examiner*—John Rivell
*Assistant Examiner*—Cloud K Lee
(74) *Attorney, Agent, or Firm*—Quarles & Brady LLP

(57) ABSTRACT

A fluid control valve includes flexible coupling between a handle and a valve stem which allows the components of the assembly on one side of a wall to be angularly misaligned with the components on the opposing side. Because the components adjacent to the room side of the wall can be mounted perpendicular to the wall, a decorative escutcheon can be mounted flush against the mounting wall when the wall or the valve is out of plumb.

3 Claims, 7 Drawing Sheets

US 7,509,971 B2

VALVE ASSEMBLY WITH COMPLIANT ESCUTCHEON

CROSS-REFERENCE TO RELATED APPLICATIONS

Not applicable.

STATEMENT OF FEDERALLY SPONSORED RESEARCH OR DEVELOPMENT

Not applicable.

BACKGROUND OF THE INVENTION

The present invention relates to fluid control valves, and in particular to valve assemblies designed for use in mounting locations that are not perpendicular or square to a wall.

Tub/shower fluid control valves are typically mounted through a wall adjacent a tub or a shower stall. The wall may be part of a unitary enclosure, or it may be a room wall such as a tiled wall forming part of a shower enclosure.

Such control valves are typically anchored to rear studs and/or adjacent wall board, and then linked to hot and cold water supply lines behind the wall. These valves usually have a valve stem that projects outward from a wall opening, and a handle is attached to the outer end of the stem to provide control over the valve from the room side of the wall.

Many of these valves are mixer valves which accept both hot and cold water, control the proportioning and volume of water there through, and deliver a mixed outlet stream to a tub filler, shower head and/or the like when the valve is turned on. See e.g. U.S. Pat. No. 5,467,799. Other such valves merely control the volume of a single supply of cold or hot water. Yet other valves divert flow to multiple devices such as a hand sprayer, shower head, and faucet, or other devices.

In any event, such valves are preferably mounted in a manner where a valve stem protrudes at a 90 degree angle from the wall. This facilitates the alignment of a decorative escutcheon that abuts against the walls outside to hide the wall opening as well as prevent air leakage through the wall opening.

Occasionally in new installations, and much more often in connection with remodeling projects, the walls of the enclosure are not perfectly plumb (vertical). Alternatively, even where they are plumb, the control valve may have been installed so that the valve stem does not extend perpendicular to the wall. Problems can also result when the thickness of the wall is more or less than expected. In any of these cases, the angle between the valve stem and the wall can be more or less than 90 degrees, which presents a number of functional and aesthetic problems for mounting the control hardware.

First of all, when the valve is not perpendicular to the wall, the handle and associated decorative elements can appear crooked and/or misaligned from inside the room. Secondly, because of variations in the wall thickness the distance between the handle and the wall can vary, again affecting the aesthetics of the installation. Additionally, if the escutcheon is secured tightly on the valve perpendicular to the valve stem, its back/inner side will not be flush against the wall. Instead, there will be a gap between the wall and the escutcheon. This gap may be unsightly, and in any event will leave an opening through which cold drafts can enter the bathroom and room moisture can leak from the room behind the room walls (possibly leading to mildew that is difficult to remove).

In the past, one approach for leveling the escutcheon against the wall, when the valve was angled with respect to the wall, was to slightly bend the escutcheon or gouge out the wall slightly where the escutcheon hit first. For some room materials (e.g. tile) this was difficult. Further, this in any event required additional time and effort and occasionally led to a somewhat unprofessional appearance. Additionally, while this correction eliminates the problem with the escutcheon, the problems with the handle remained.

U.S. Pat. No. 572,911 disclosed a fluid control valve that had a pipe section formed with an annular shoulder or bulge defining a curved surface of increased diameter than the pipe section that fit into a curved pocket in an escutcheon. The escutcheon could swivel or pivot around the shoulder to be at a non-perpendicular angle relative to the pipe.

U.S. Pat. No. 1,163,457 disclosed a somewhat similar assembly albeit here the bulge or shoulder was on an annular member (separate from the spigot pipe) and the escutcheon did not appear to have a concave pocket.

The assemblies disclosed in both of these patents left the shoulder and mating surface of the escutcheon visible from inside the room. Also, when the escutcheon was at a non-perpendicular angle on the spigot it overlapped portions of the shoulder differently, making it somewhat evident that the escutcheon was angled with respect to the wall. Furthermore, the correction did not improve the appearance of the handle installation or account for differences induced by wall thickness.

U.S. Pat. No. 6,807,983 disclosed a fluid control valve including a swivel joint for pivotally mounting, a decorative escutcheon relative to a valve body so that the escutcheon could be mounted flush against the mounting wall when the valve is not perpendicular to the wall. While accounting for gaps between the wall and the escutcheon, however, this joint also does not correct for variations in the angle and distance of the handle to the wall.

Thus, a need still exists for an improved valve assembly in which the escutcheon can be mounted in a decorative manner, yet flush, against a mounting wall, and which provides a handle that is perpendicular to the wall when the valve is not aligned perpendicular to the wall.

SUMMARY OF THE INVENTION

The invention provides a fluid valve assembly including a valve housing including a valve stem rotatable about a first axis. The valve is coupled to a handle rotatable about a second axis, which is coupled to the valve stem to cause the valve stem to rotate about the first axis as the handle is rotated about the second axis. Therefore, the valve can be opened and closed irrespective of a misalignment between the valve stem and the handle, and the handle can be positioned perpendicular to the wall irrespective of the angle of the valve stem.

In accordance with the invention, at least one of the handle and the valve stem comprises a plurality of slots and the other of the handle and the valve stem comprises a plurality of projections sized and dimensioned to be received in the slots. The slots and radial projections can be provided in a stem adapter and a stem driver coupled to the valve stem and handle, respectively. The interconnection between the slots and radial projections provide a flexible coupling for transferring torque between the handles and the valve stem. The radial projections can be elliptical.

In accordance with another aspect of the invention, a fluid valve assembly is provided including a valve housing. A valve stem extends from the valve housing, and is rotatable about a first axis for controlling fluid flow through the fluid valve. The valve stem is coupled to a flexible coupling device, which is coupled to a handle that is rotatable about a second axis. As the handle is rotated about the second axis, the flexible coupling device causes the valve stem to rotate about the first axis.

In another aspect of the invention, the flexible coupling device can comprise a plurality of radially-extending projections linked to at least one of the valve stem and the handle, and a plurality of slots sized and dimensioned to receive the radially extending projections linked to the other of the valve stem and the handle.

In another aspect of the invention, the fluid valve can include a decorative escutcheon that is selectively alignable about the handle.

In yet another aspect, the invention provides a fluid valve assembly, comprising a valve from which extends a movable valve stem for controlling fluid flow, a mounting plate adapted to be selectively positioned and mounted around the stem, and a handle linked to the valve stem through a flexible connecting device. If the assembly is mounted such that the stem is at a first angle relative to a room wall, and such that the handle is mounted at a second angle relative to the room wall, the flexible connecting device transfers torque between the handle and the stem to open and close the valve, and the mounting plate is selectively positioned to center the valve stem within the mounting plate.

The valve can further include an escutcheon mountable around the stem, the escutcheon being selectively positioned to be centered about the stem and the handle, and a skirt mounted around the stem and having an outer end with an opening therein and an inner end adapted to be coupled to the connector in the mounting plate.

The valve assembly can also include a seal plate adapted to be coupled to the valve and including an aperture for receiving the mounting plate. The mounting plate can include a flange having a first and a second flat wall, and the sealing plate can also include a flange having a first and a second flat wall, the interaction of the walls in the seal plate and the walls in the mounting plate preventing rotation of the mounting plate past a predetermined position.

In another aspect of the invention, the flexible coupling device can include elongate slots, sized and dimensioned to receive radially-extending projections which can be positioned axially to account for variations in a thickness of a wall provided between the valve and the handle.

In still another aspect of the invention, the assembly can comprise an elastic junction, a slider block, a flexible disc, a rubber insert, a traditional yoke/link universal joint, a flexible beam servo coupling, a bellows servo coupling, a gear type servo coupling, or a ball type servo coupling.

Thus, the present invention provides an assembly which includes a flexible coupling device for coupling the valve stem to a handle so that the handle can be mounted perpendicular to the wall and the escutcheon can be mounted flush against the mounting wall when the valve is not aligned perpendicularly to the wall.

The assembly thus offers a quick and easy way to achieve a clean, professional look when installing fluid valves. This eliminates gaps or spaces between the escutcheon and the wall (without the need for bending the escutcheon, gouging the wall or inserting fillers). The concept would also work on control valves mounted on horizontal support surfaces (e.g. on a tub mounting rim). In such a case the term "outer" would mean "upper", and the term "inner" would mean "lower".

Moreover, even where the valve is perpendicular to the wall, the assembly can be used. Another advantage is that the swivel joint is largely concealed when the assembly is fully assembled, so that there is little or no visual indication that the installation is out of plumb.

These and still other advantages of the invention will be apparent from the detailed description and drawings. While a particular preferred embodiment has been disclosed hereafter, it should be recognized that the invention is not so limited. Rather, the claims should be looked to in order to judge the full scope of the invention.

DETAILED DESCRIPTION OF THE PREFERRED EMBODIMENT

Figure 1:
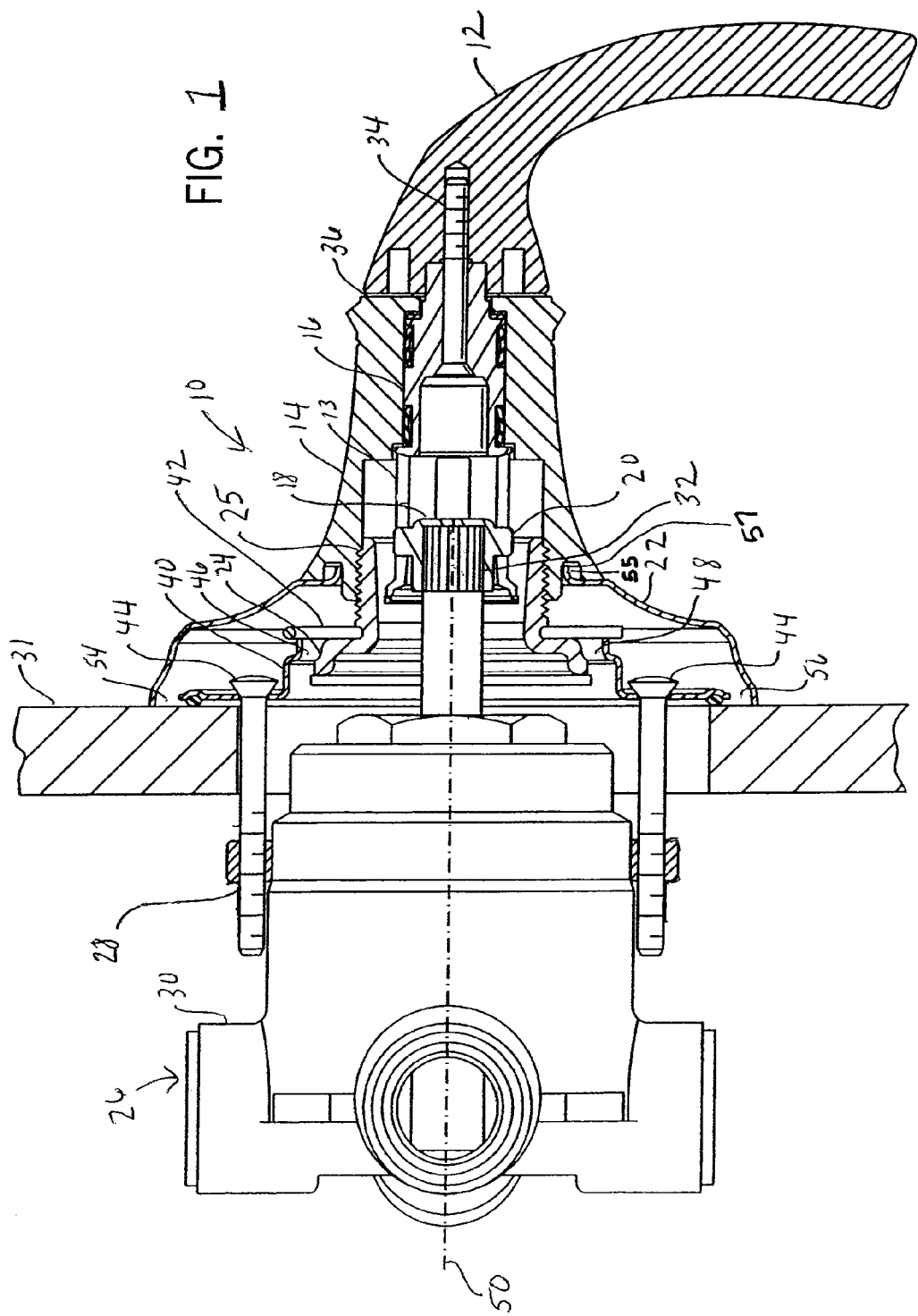
FIG. 1 is a cross sectional view of a fluid control valve assembly of the present invention as it would be positioned for mounting on a vertical wall, with a properly perpendicular rough-in assembly.
Figure 2:
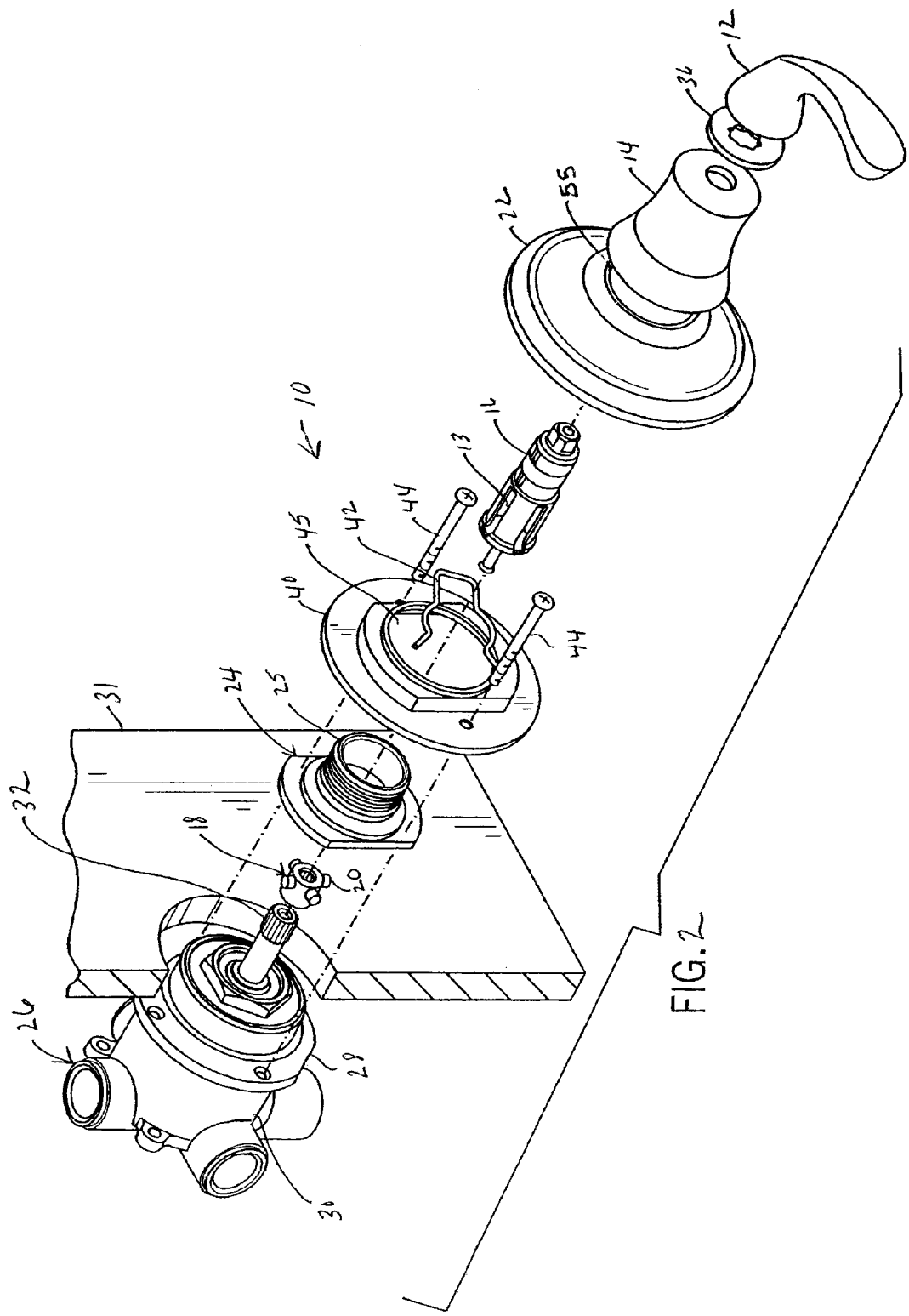
FIG. 2 is an exploded perspective view thereof.

Referring now to the figures and more particularly to FIGS. 1 and 2, a valve assembly (generally 10) of the present invention includes a handle 12, a skirt 14, a stem driver 16, a stem adapter 18, a seal plate 40, a clip 42, a decorative escutcheon 22, a mounting plate 24 and a main valve 26. One possible valve mechanism to be used inside the housing parts is that described in U.S. Pat. No. 5,467,799, the disclosure of which is hereby incorporated by reference as if fully set forth herein.

The valve 26 can include a housing or body 30 that includes apertures 28. The apertures 28 receive coupling devices such as threaded fasteners 44 to bolt a seal plate 40 provided on the room side of a wall 31 opposite the valve 24 to the valve 26.

Figure 4:
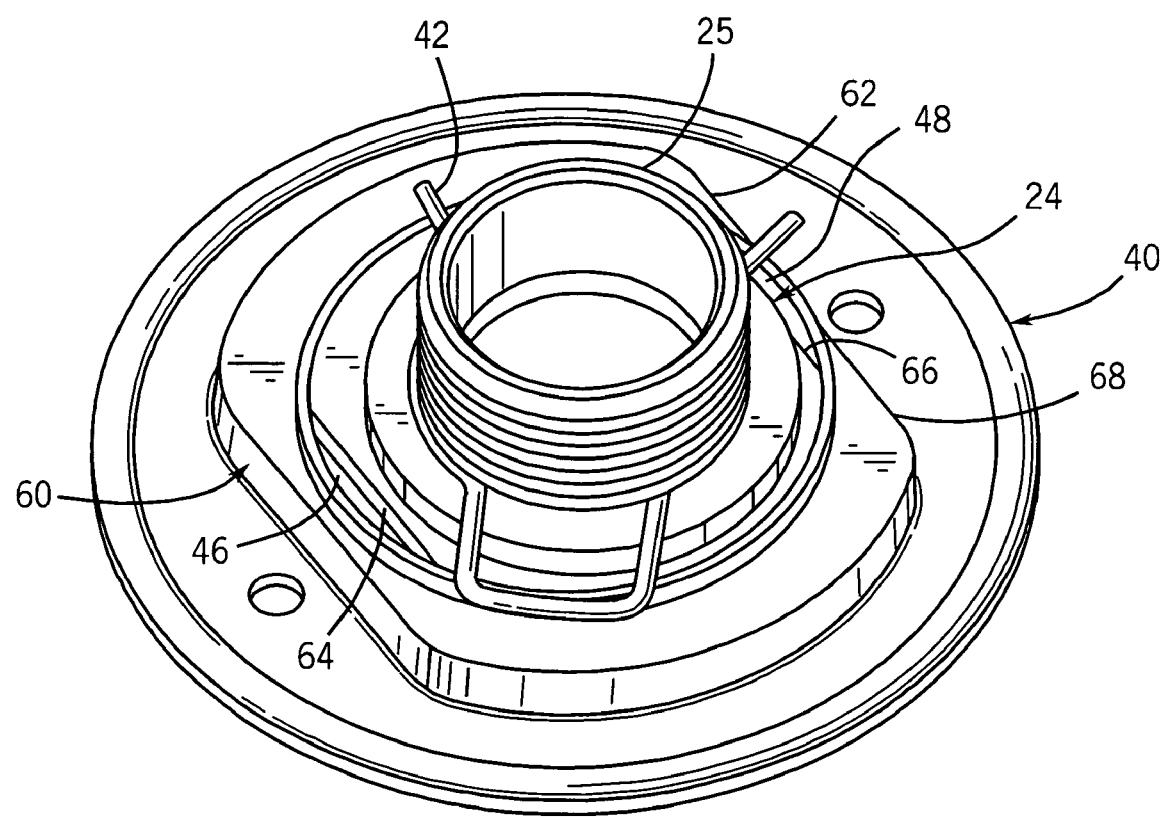
FIG. 4 is a perspective view of a mounting plate thereof assembled to a seal plate thereof.

Referring now also to FIG. 4, the seal plate 40 includes a raised flange 61 having a first and a second flat wall 60 and 62 on opposing sides of an aperture 45. The aperture 45 receives a mounting plate 24 which is retained against the wall 31 by the seal plate 40. The mounting plate 24 includes a flange 68 (FIG. 4) having first and second flat walls 64 and 66 and a threaded hub 25 extending from the flange 68 for receiving a handle assembly, as described below.

Threaded hub 25 extends through the aperture 45 in the seal plate 40 and is retained in position in the same plane as the seal plate 40 by the clip 42, which extends over the flange 61 of the seal plate 40. The aperture 45 is sized and dimensioned to allow the mounting plate 24 to "float" such that the plate 24 can be selectively positioned within the aperture 45 to center the hub 25 relative to the valve stem 32, as described below. The flange 61 in the seal plate 40 and the flange 68 in the mounting plate 24 cooperate the retain the mounting plate 24 in position. Rotation of the hub 25 is limited by interaction of the flat walls 60 and 62 in the seal plate 40 and the flat walls 64 and 66 on the mounting plate 24. Depending on the position of the mounting plate 24 within the aperture 45, gaps 46 and 48 of varying sizes are formed between the mounting plate 24 and seal plate 40.

Referring again to FIGS. 1 and 2, as assembled, the valve stem 32 extends from the body 30 of the valve 26, through the wall 31, through the aperture 45 in the seal plate 40, and through threaded hub 25 into the room. Stem adapter 18, including a plurality of radially-extending projections 20, is coupled to the end of the valve stem 32 for providing a connection to the handle 12. Water supply lines can be coupled to the body 30 through standard connections to control the flow and, in some cases, the temperature of water provided.

The handle 12 is coupled to the skirt 14 and the stem driver 16 through a threaded fastener such as axial bolt 34 to form a handle assembly. The stem driver 16 includes a cylindrically-shaped hollow end including a plurality of slots 13, which are preferably elongate as shown, and which are sized and dimensioned to receive the radially-extending projections 20 in the stem adapter 18. A washer 36 can be inserted between the handle 12 and the skirt 14 to ease rotation of the handle 12, if desired. Alternatively, a lubricant can be provided at this position, and/or the materials can be selected to permit sliding contact.

To connect the handle 12 to the valve stem 32, the skirt 14 of the handle assembly is threaded onto the hub 25 of the first mounting plate 24, and the radially-extending projections 20 of the stem adapter 18 are engaged in the elongate slots 13 in the stem driver 16. The interconnection between the radially-extending projections 20 and the slots 13 provides a flexible coupling or largely "universal joint", allowing torque to be transferred from the handle 12 to the stem driver 32, even when there is substantial angular misalignment between the stem driver 32 and handle 12. Furthermore, the radially-extending projections 20 on the stem adapter 18 are adapted to move axially within the slots 13 to adjust for the thickness of the wall 31, which determines the relative distance between the stem driver 16 and the valve stem 32.

Figure 5:
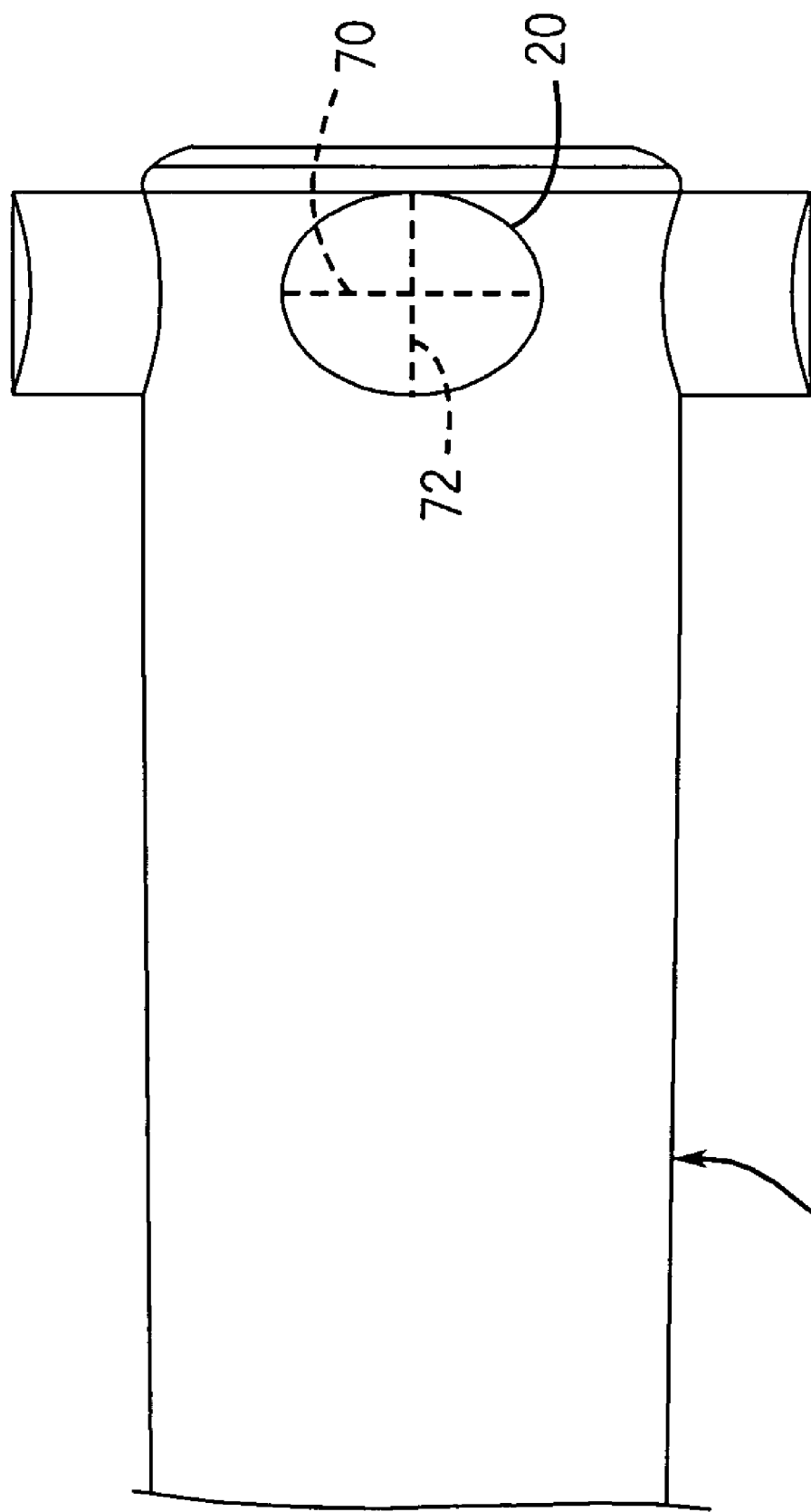
FIG. 5 is a partial view of the stem adapter of FIG. 1.
Figure 6:
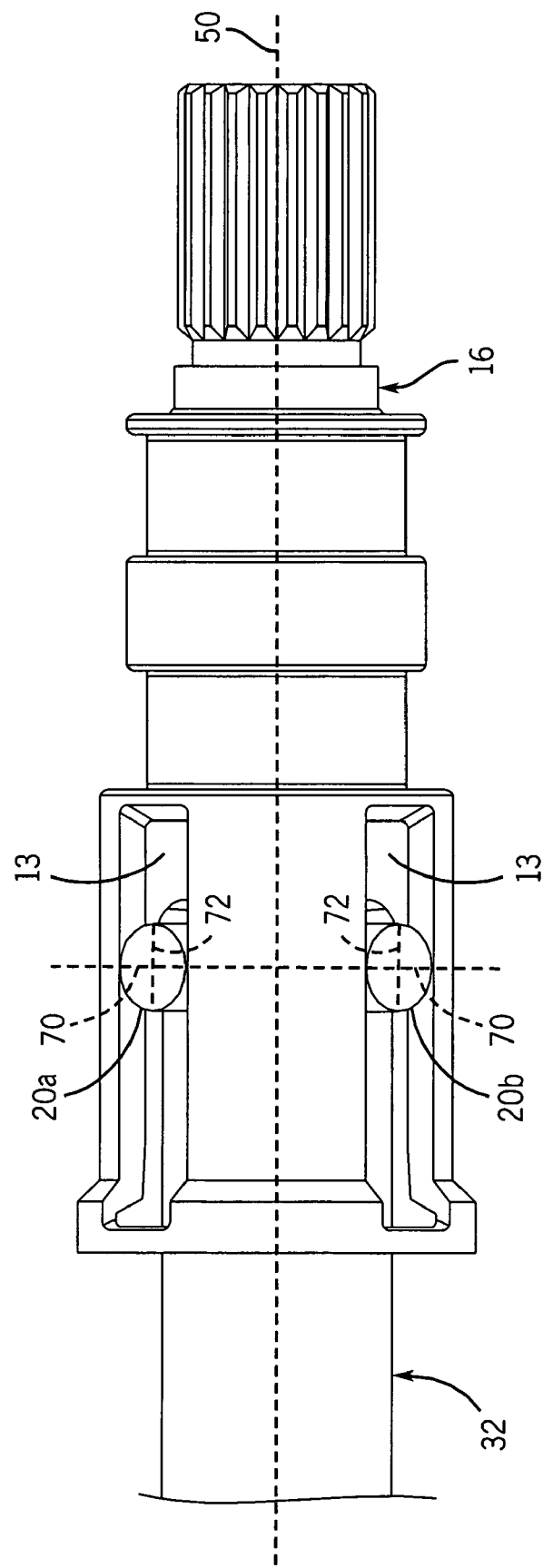
FIG. 6 is a cutaway perspective view of the stem adaptor of FIG. 5 received in a stem driver aligned at a first angle.
Figure 7:
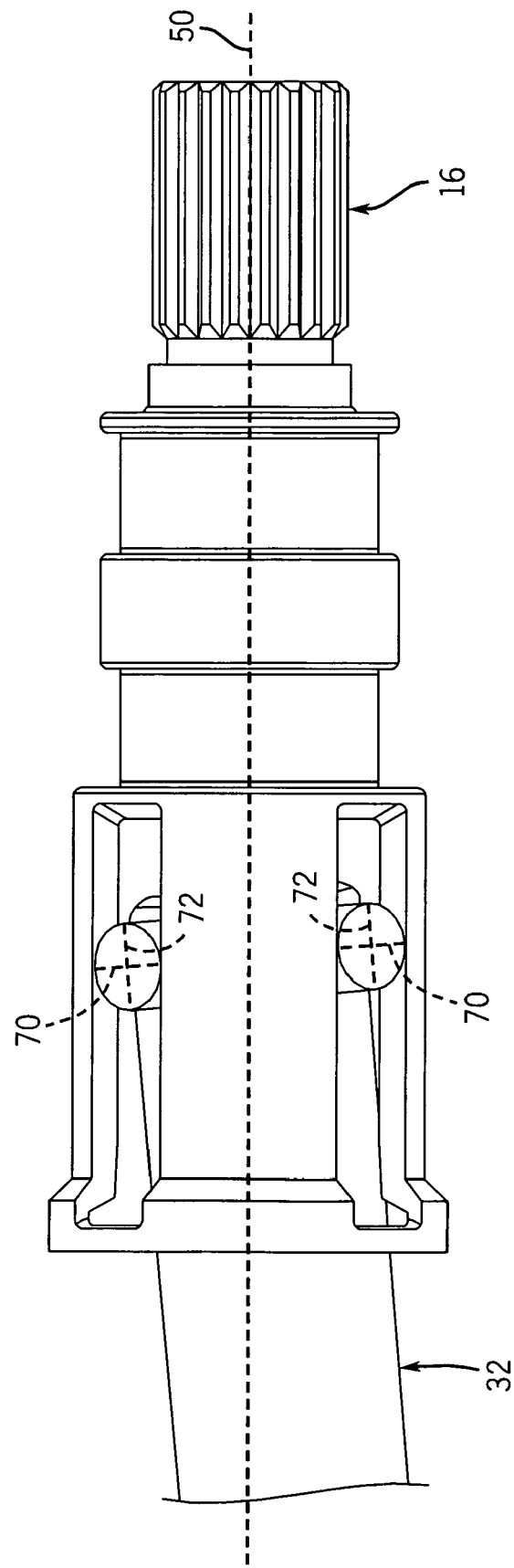
FIG. 7 is a partial perspective view of the stem adaptor of FIG. 5 received in a stem driver and aligned at a second angle.

The radially-extending projections 20 can be constructed in a number of different shapes including round. Referring now to FIGS. 5 through 7, in one embodiment of the invention, the radially-extending projections 20 are elliptical in shape with a major axis 70 that extends generally side-to-side across the slot 13 in the stem driver 16 when assembled, and a minor axis 72 extending generally in the direction of the length of the slot 13. The major axis 70 is sized and dimensioned to allow the projection 20 to fit within the slot 13 within a tight tolerance, but with sufficient clearance for movement. Referring now specifically to FIG. 6, when the axes of rotation of the stem driver 16 and the valve stem 32 are aligned, the projections 20a and 20b are aligned perpendicularly to the axis of rotation 50 of the stem driver 16, and rotation of the stem driver 16 causes contact between the projections 20a and 20b and the side of the respective slot 13 in the direction of rotation. Referring now to FIG. 7, as the axes of the stem driver 16 and valve stem 32 become misaligned, the opposing sides of the projections 20a and 20b reach a point at which each side of the projection 20b contacts a side of the slot 13, providing a limit point preventing further angular misalignment. It has been shown experimentally that using the elliptical shape provides torque transfer over a wider range of angular misalignment between the handle 12 and the valve stem 32 than a round configuration. It will be apparent that variations in the range of angular misalignment can therefore be achieved by modifying the size of the slots 13 and projections 20, by varying the relative dimensions of the major and minor axes of the ellipse, and by otherwise varying the shape of the projections 20. The radially-extending projections can also be formed in other shapes, including parabolas, splines, or other configurations.

Referring again to FIGS. 1 and 2, decorative escutcheon 22 is mounted over the seal plate 40 and mounting plate 24. A lip 55 of the escutcheon 22 is received in a mounting groove 57 in the skirt 14, and prevents water from entering under the escutcheon 22 without the need for an extra sealing element.

As assembled, the escutcheon 22 is held in position by the threaded connection between the hub 25 and skirt 14. The escutcheon 22 is sized and dimensioned to allow the escutcheon 22 to be repositioned about the seal plate 40 and centered around the valve stem 32 and handle 12 even when the valve assembly components are misaligned. Centering the escutcheon 22 results in varying the spacing or gaps 54 and 56 between the seal plate 40 and escutcheon 22, as described below.

Figure 3:
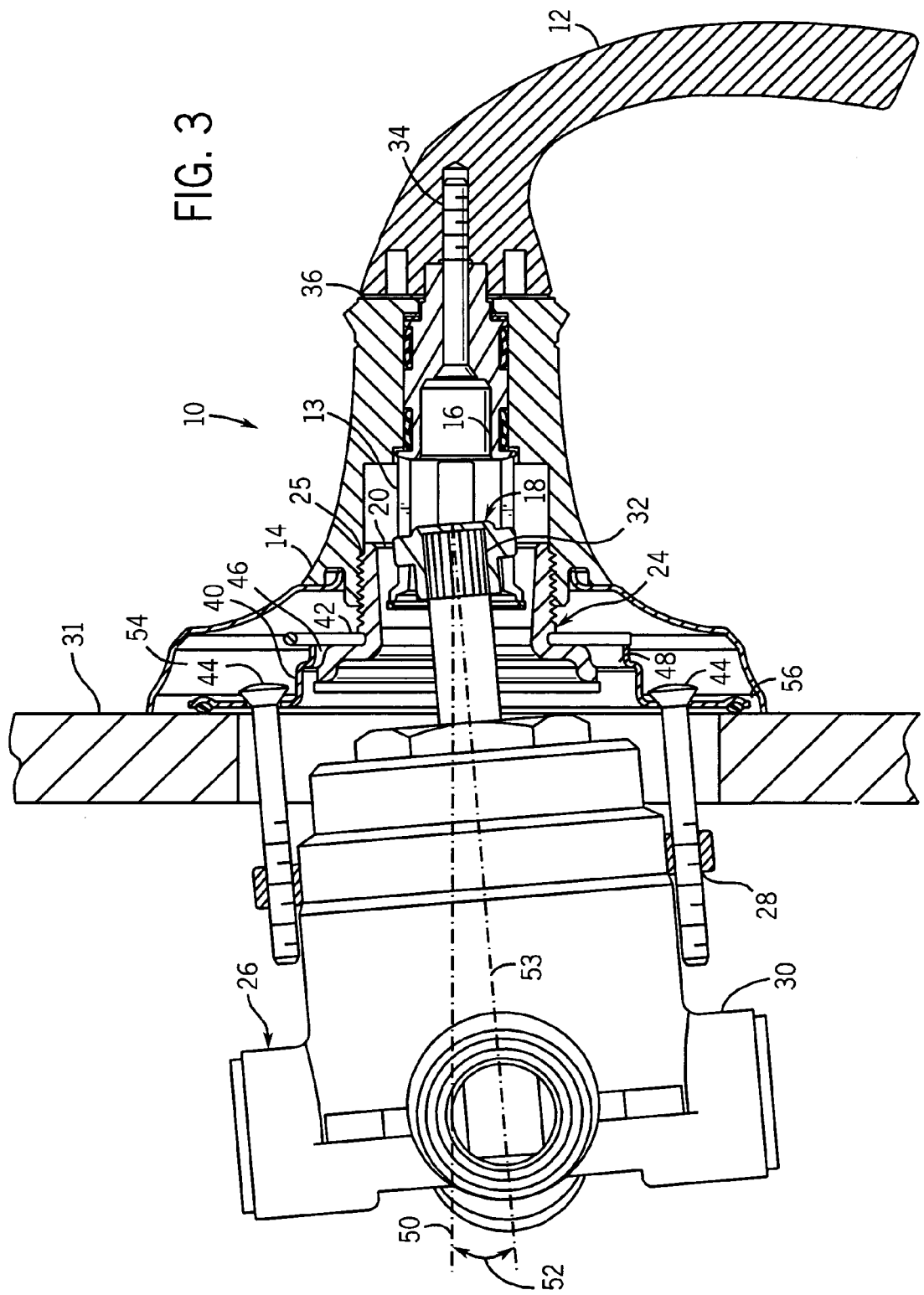
FIG. 3 is a cross-sectional view of the fluid control valve assembly in which the valve is mounted at an angle to wall.

Referring now to FIGS. 1 and 3, the valve assembly 10 is shown assembled to the wall 31 a misalignment, as shown in FIG. 3, may occur when the angle between the valve stem 32 is more or less than 90 degrees from the adjacent surrounding wall, as when the rough-in is not square or perpendicular to the wall.

Referring now specifically to FIG. 1, here the portions of the valve assembly 10 on the room side of the wall 31 and on the opposing side of the wall 31 are each perpendicular to the wall 31, and are aligned along a horizontal line 50. The flexible coupling provided between the stem driver 16 and stem adapter 18 is aligned along the same horizontal line 50, and the threaded hub 25 of the mounting plate 24 is therefore substantially centered in the aperture 45 of the seal plate 40. Here, therefore, gaps 46 and 48 formed between the seal plate 40 and the mounting plate 24 are substantially identical. Furthermore, the escutcheon 22 is substantially centered over the seal plate 40, as shown by the gaps 56 and 58, which are also substantially identical. Rotation of the handle 12 therefore causes the valve stem 32 to rotate to adjust the flow rate and, in some cases, the temperature of the water through the valve 26.

Referring now to FIG. 3, here the portions of the valve assembly 10 on the side of the wall 31 opposite the room are offset from the horizontal line 50 at an angle 52. The portions of the valve assembly 10 on the room side of the wall 31, however, can be retained perpendicular to the wall 31 and in alignment with the horizontal line 50 because of the flexible connection provided between the stem driver 16 and stem adapter 18. As the handle 12 is rotated, the flexible connection allows the stem driver 16 and handle 12 to be aligned along an axis defined by the horizontal line 50, even though the stem driver 32 is aligned along the line 53 at angle 52. Because of the essentially "universal joint", torque can be transferred to the valve stem 32 when the handle 12 is rotated, even though the handle 12 and valve stem 32 are not aligned, and rotate about different axes.

To accommodate the misaligned components, the mounting plate 24 and associated hub 25 have been located in the aperture 45 of the seal plate 40 to center the flexible coupling between the stem driver 16 and stem adapter 18 within the hub 25. Because of the angular misalignment, this position is offset from the center as shown in FIG. 1, and therefore adjustments are made in both the position of the mounting plate 24 and escutcheon 22. The offset can be seen by reference to the gaps 46 and 48 formed between the seal plate and the mounting plate 24.

The gap 46 provided between the seal plate 40 and mounting plate 24 on a first side of the assembly 10 is substantially smaller than the gap 48 on the opposing side. Because the escutcheon 22 is coupled to the skirt 14, which is positioned in alignment with the mounting plate 25 and handle 12, the gaps 54 and 56 between the seal plate 40 and escutcheon 22 are also unequal. The skirt 14 and escutcheon 22 cover the position of the seal plate 40, and these offsets therefore result in the appearance that the handle is centered in the valve, irrespective of any misalignment and/or angular offset.

Thus, the present invention provides an assembly, particularly designed for a tub/shower control valve, which offers a quick and easy way to achieve a clean, professional look with no gaps or spaces between the escutcheon and the wall (without needing to bend the escutcheon, gouge the wall or insert fillers).

The present invention provides both functional and aesthetic improvements for valves installations, and can be applied between the handle 12 and the valve 26 despite substantial angular misalignment between the rotational axis of the valve 26 and the handle 12. Functionally, the present invention provides a flexible coupling or essentially universal joint which allows for proper alignment and operation of the valve despite misalignment of the valve. Furthermore, since the slots 13 provided in the stem driver 16 are significantly longer than the radially-extending projections 20 in the stem adapter 18, the stem driver 16 can be repositioned axially to account for thinner and thicker walls and therefore to account for a range of rough-in depths.

Aesthetically, the invention as described above, compensates internally for variations in the installation of the valve and therefore makes the assembly appear to be perpendicular and aesthetically correct from the room side of the wall, even when installed with a valve angled to the wall. Because the components on the room side of the wall can be mounted perpendicular to the wall, gaps are eliminated between the wall and escutcheon, and the invention provides an aesthetic mounting that has no visible features resulting from a misalignment. The decorative trim, furthermore, is centered irrespective of valve angularity. Additionally, the distance from the handle to the wall is fixed regardless of the wall thickness.

Although a specific flexible coupling has been described above, it will be apparent that a number of different mechanical couplings could be used to provide an essentially universal joint connection between the valve and the handle. Any flexible drive coupling that permits torque transmission between non-parallel shafts, including, for example, an elastic junction, slider block, flexible disc, rubber insert, or traditional yoke/link universal joint could also be used. Furthermore, flexible beam, bellows, gear type, and ball type servo couplings could be used. Other couplings, such as a straight blade received in a slotted socket, can also be used. Various other such couplings will be known to those of skill in the art.

Additionally, although the coupling between the valve stem and the handle is shown as provided through a separate stem adapter and driver, it will be apparent that these components could be added directly to the valve and/or handle, or otherwise configured. Additionally, from the disclosure contained herein, other modifications and variations to the preferred embodiment will be apparent to those skilled in the art, which will be within the spirit and scope of the invention. Therefore, the invention should not be limited to just the described embodiment. To ascertain the full scope of the invention, the following claims should be referenced.

INDUSTRIAL APPLICABILITY

The invention provides a fluid control valve assembly particularly suited to adjust for assemblies which are angled with respect to the mounting surface.

I claim:

1. A fluid valve assembly, comprising:
   a valve from which extends a movable valve stem for controlling fluid flow through the fluid valve;
   a mounting plate having an axially projecting open-ended hub positioned around the stem and having a flange with at least one axially extending wall;
   a seal plate to which the valve is mounted having an aperture receiving the hub of the mounting plate and including a flange having at least one axially extending wall at least a portion of which is positionable in spaced relation with respect to the wall of the mounting plate to allow the position of the seal plate to be adjusted relative to the mounting plate; and
   a rotatable handle linked to the hub of the mounting plate to rotate about an axis of rotation that it is fixed essentially concentric with respect to the hub of the mounting plate and relatively adjustable with respect to the seal plate;
   wherein the handle is linked to the valve stem through a flexible coupling device, which includes a stem adaptor linked to the valve stem and a stem driver linked to the handle, wherein at least one of the stem adapter and the stem driver comprises a plurality of slots and the other of the stem adapter and the stem driver comprises a plurality of projections sized and dimensioned to be received in the slots, whereby the flexible coupling device can transfer torque between the handle and the stem to open and close the valve even when the handle and stem are rotating on different axis axes.

2. The valve assembly as recited in claim 1, further comprising an escutcheon mountable around the stem in fixed relation to the mounting plate and adjustable relation to the seal plate.

3. The valve assembly as recited in claim 1, further comprising a skirt mounted around the stem and having an outer end with an opening therein and an inner end adapted to be coupled to the hub of the mounting plate, wherein the skirt is mounted in fixed relation to the mounting plate and adjustable relation to the seal plate.

* * * * *